July 3, 1934.   C. R. GABRIEL   1,965,228
METHOD AND APPARATUS FOR TRIMMING THE EDGES OF DRAWN SHELLS OR THE LIKE
Filed Oct. 12, 1932   5 Sheets-Sheet 1
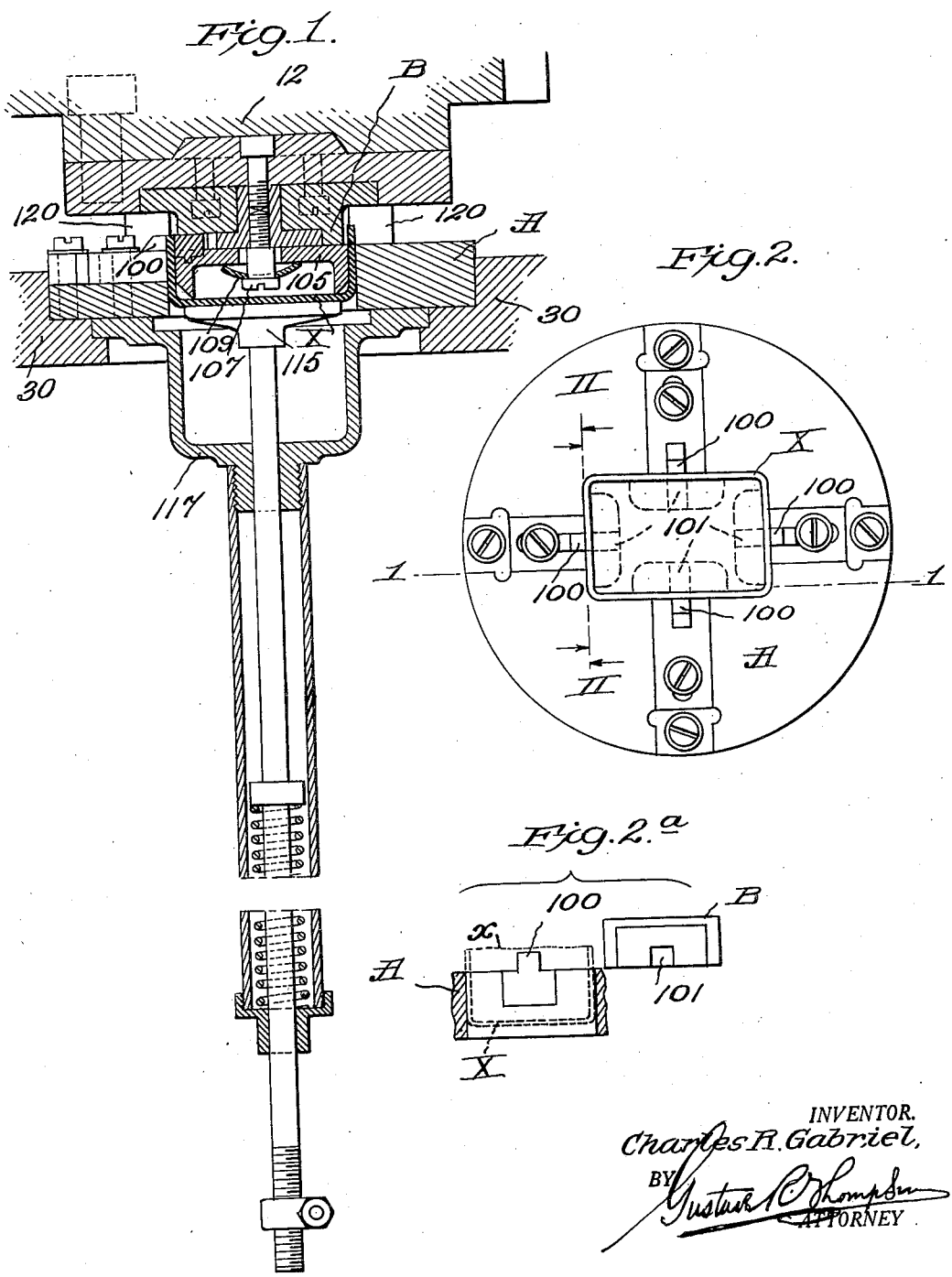
INVENTOR.
Charles R. Gabriel,
BY
Gustav C. Thompson
ATTORNEY July 3, 1934.  C. R. GABRIEL  1,965,228
METHOD AND APPARATUS FOR TRIMMING THE EDGES OF DRAWN SHELLS OR THE LIKE
Filed Oct. 12, 1932  5 Sheets-Sheet 2

INVENTOR.
Charles R. Gabriel,
BY
ATTORNEY

July 3, 1934.  C. R. GABRIEL  1,965,228
METHOD AND APPARATUS FOR TRIMMING THE EDGES OF DRAWN SHELLS OR THE LIKE
Filed Oct. 12, 1932  5 Sheets-Sheet 3
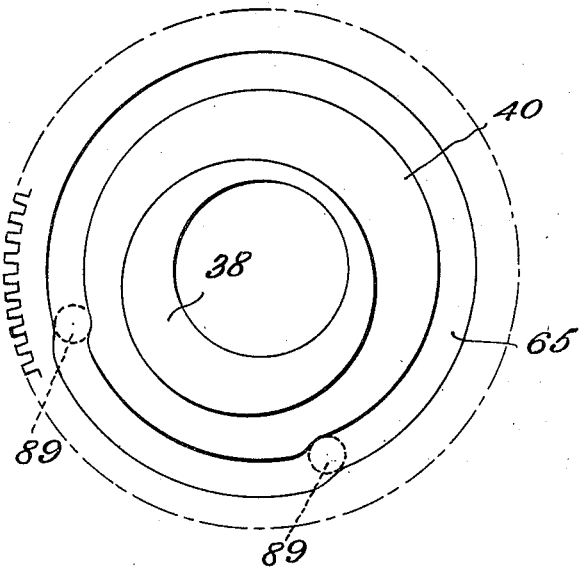
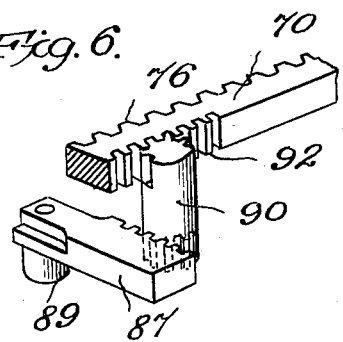
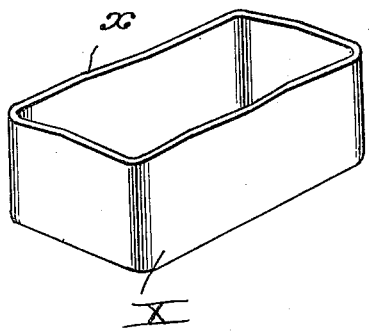
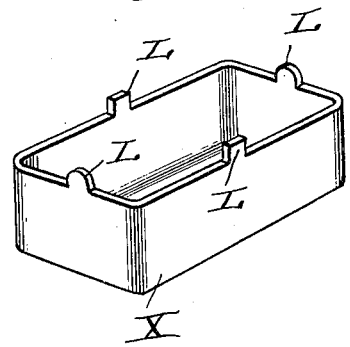
INVENTOR.
Charles R. Gabriel,
BY
Gustav R. Thompson
ATTORNEY.

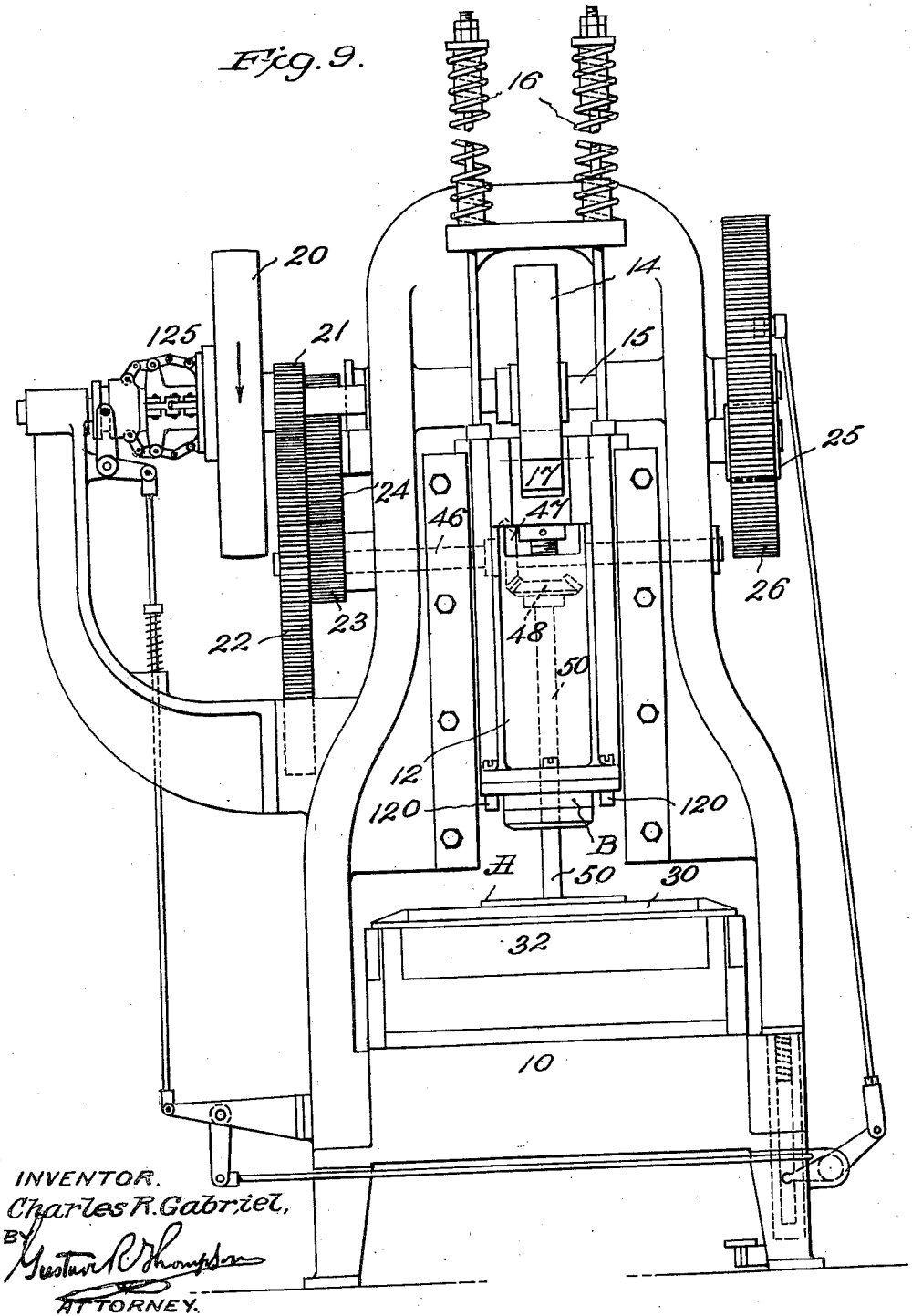

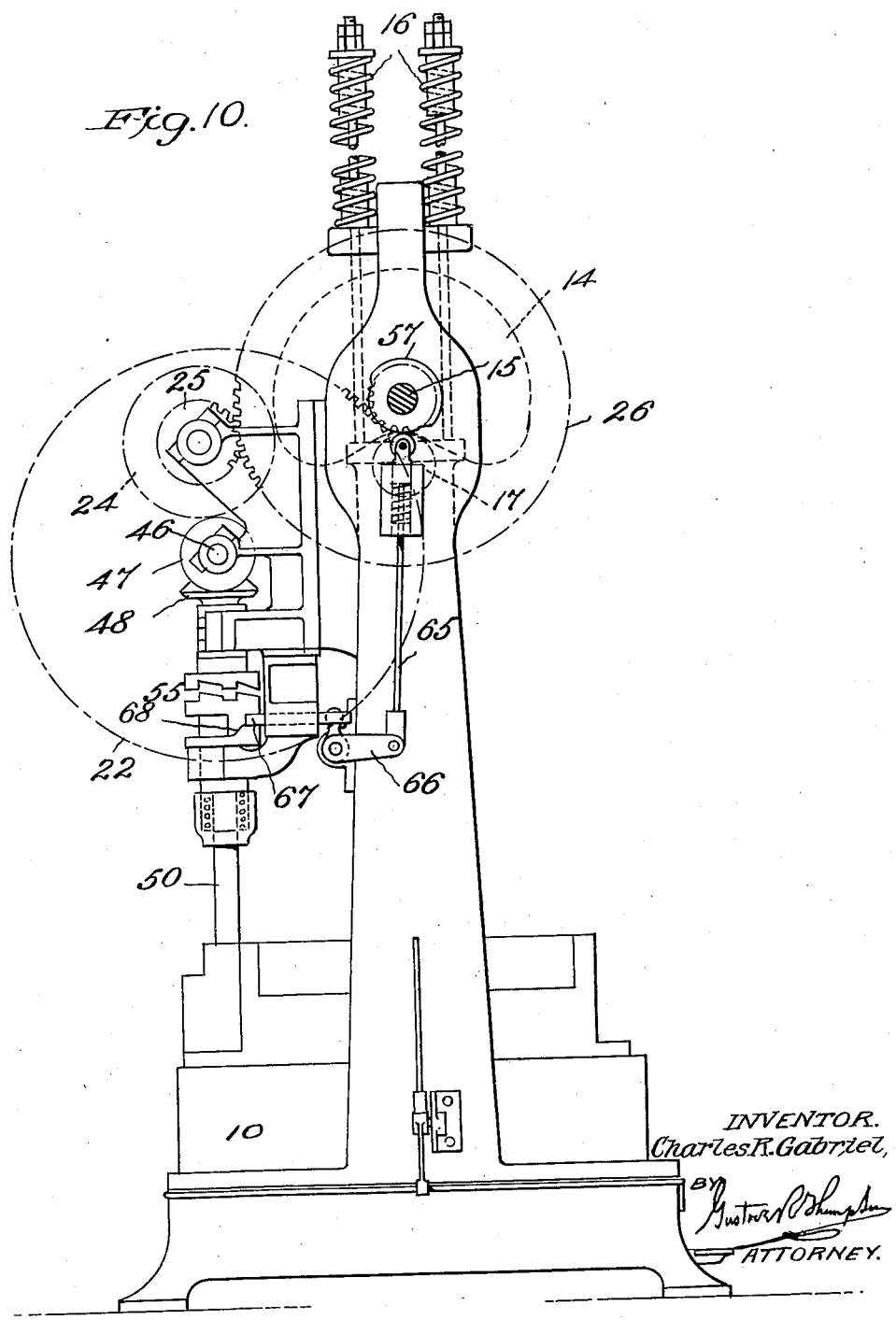

Patented July 3, 1934

1,965,228

UNITED STATES PATENT OFFICE 1,965,228

METHOD AND APPARATUS FOR TRIMMING THE EDGES OF DRAWN SHELLS OR THE LIKE

Charles R. Gabriel, Brooklyn, N. Y.; Jenny Winifred Gabriel executrix of said Charles R. Gabriel, deceased Application October 12, 1932, Serial No. 637,474

12 Claims. (Cl. 164—29)

This invention relates to a method and apparatus for trimming the edges of drawn shells, or the like, and provides improvements therein, the type of method and apparatus to which the present invention relates being illustrated by my Patents Nos. 1,235,197 and 1,265,901.

The present invention provides a method and means by which a great force may be applied to the shearing dies, so that shells of relatively thick or heavy metal may be trimmed.

The present invention further provides a method and means by which, in trimming the shell projecting lugs or notches may be formed, or left, in the margin of the shell at any and all sides thereof,—particularly at two, three, or four sides of a four-sided shell.

The present invention further provides for greatly minimizing wear on the parts affecting the registration of the dies, so that the apparatus and parts may have materially longer effective life.

The present invention further provides a new mechanical movement;—a mechanically driven slide having confined movement in four directions in one plane.

Other improvements are contained in the mechanical constructions and arrangements hereinafter described and illustrated.

An embodiment of the invention is illustrated in the accompanying drawings, in which, Fig. 1 is a vertical sectional view of a part of a machine, showing the dies together.

Fig. 2 is a plan view looking down on the top of the lower die.

Fig. 2ª is an enantiomorphic view of the parts facing the line II—II Fig. 2.

In Fig. 3, the lower die, and the plate on which it is mounted, are omitted.

Fig. 5 is a top plan view of one of the parts shown in Figs. 3 and 4, and showing the eccentric and cam thereon.

Fig. 6 is a perspective view illustrating in detail the construction and arrangement of the cam-actuated slide, pinion and slidable-block seen at each side of Fig. 3.

Figs. 7 and 8 are perspective views of shells, before and after trimming.

Figs. 9 and 10 are respectively front and side elevations of a press and showing coordinated means for moving the shearing dies together and apart, and for driving the mechanism to effect the shearing action by the dies.

Figure 3:
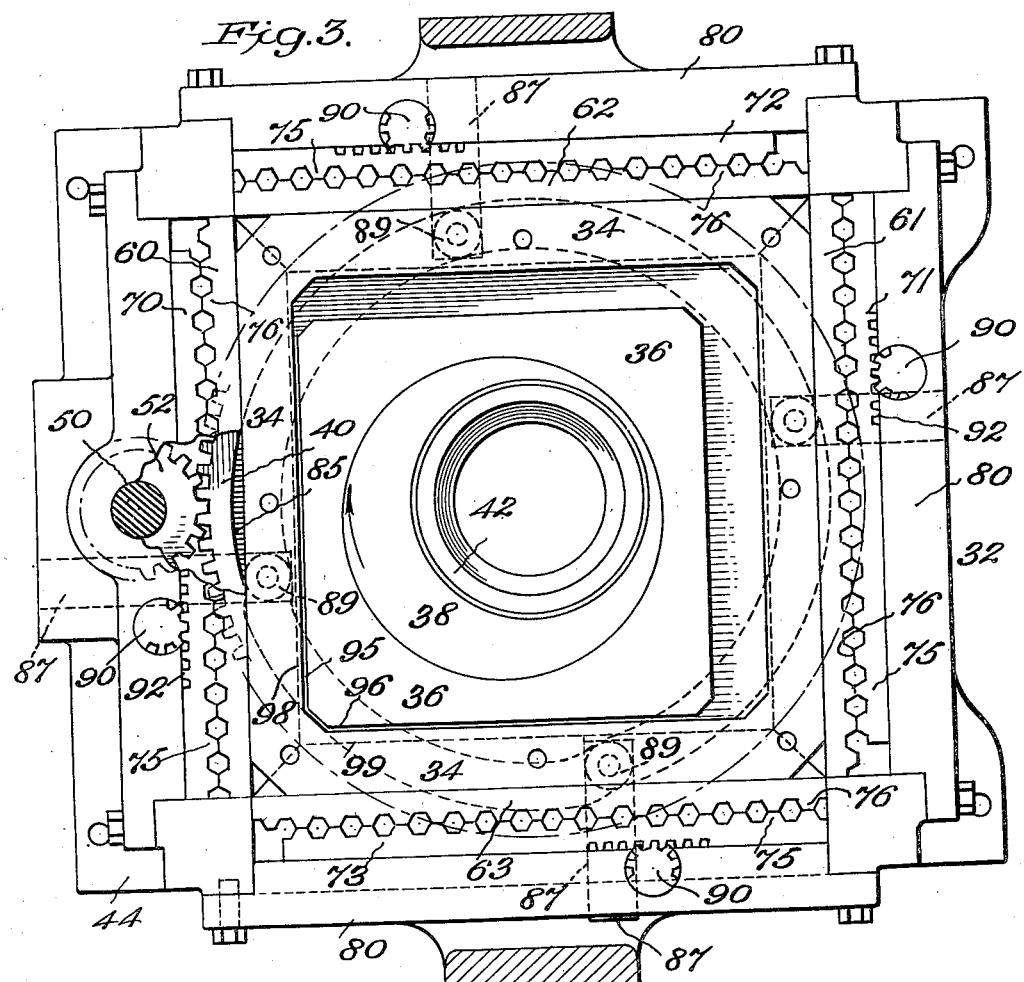
Figs. 3 and 4 are respectively a top plan view and combined vertical section and elevation of the part of the apparatus immediately concerned with the driving and movement of the lower die, and constituting a new mechanical movement.
Figure 4:
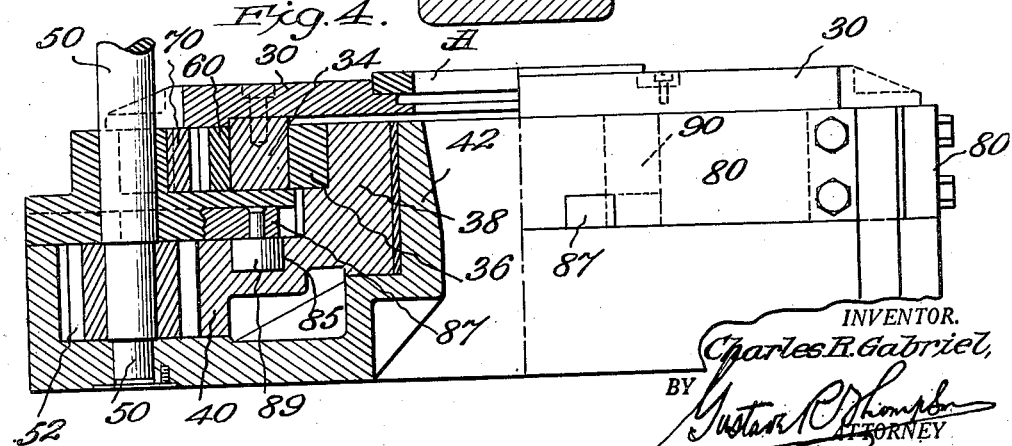

Referring to said drawings, letters A and B designate the shearing dies. Means are provided for moving these dies together and apart, a shell X being placed in the die A while the dies are apart, having its margin $x$ trimmed while the dies are together, and being removed and replaced with another shell X when the dies are apart the next time.

The dies A, B are preferably moved together and apart in a press having a bed 10 on which die A is carried, and a reciprocating slide 12 on which die B is carried. The slide 12 may be actuated by a cam 14, on a shaft 15, which provides for a dwell thereof in the position where dies A and B are together, during which time the dies are actuated to trim the edge of the shell held between them. Springs 16 hold a roller 17 on slide 12 against the face of cam 14. Shaft 15 may be driven from a fast-and-loose fly-wheel pulley 20 through gears 21, 22, 23, 24, 25, 26.

Die A is carried on a plate 30 which is moved in four directions in one plane, by a novel mechanism or mechanical movement 32.

Die plate 30 is fastened to a slide 34 which is moved by a block 36 in which turns a port for imparting an orbital movement thereto, as an eccentric 38. A crank would be an equivalent. The eccentric 38 conveniently forms part of a gear 40 which turns on a spindle 42 which may be formed on a plate 44 which is fastened to the bed 10 of the press. Gear 40 is conveniently driven from pulley 20 through gears 21, 22 shaft 46, bevel gears 47, 48, shaft 50, and pinion 52 meshing with said gear 40.

The driving of gear 40 is coordinated with the movement of the slide 12, in such manner that the die B will register with the inside of a shell carried in die A when the dies are brought together by the slide 12. This may be accomplished by a clutch 55 on the shaft 50 and a cam 57 turning with the cam 14, and acting through a rod 65, bellcrank 66, slide-finger 67 and a cam 68, to open and permit closing of the clutch 55 while the slide 12 is held down by the "dwell" portion of cam 14, the length of cam 62 being such that the gear 40 is rotated one complete rotation while shaft 50 is connected through clutch 55 with the driving pulley 20. The die-plate 30 (and die A thereon) start and stop from a position in which dies A and B register.

The slide 34 is movable in four directions, and is guided by two pairs of guides 60, 61; 62, 63. When the slide is driven in any direction the guides parallel with the direction of movement are supported or held firmly against the sides of the slide, the guide in the direction of movement being then unsupported or free so as to permit movement of the advancing side of slide 34. Means for supporting the guides 60—63 in the manner just described may comprise blocks 70, 71, 72, 73 having a series of projections 75 thereon. Similar projections 76 may be provided on the back sides of guides 60—63. The blocks 70—73 may bear against the inner sides of a stout frame 80. The blocks 70—73 are movable to and from a position where the projections 75, 76 are in line (come into contact) so that pairs of guides at a time may firmly support the slide 34, and means for this purpose may comprise a cam 85 (which is conveniently a groove in gear 40) a toothed slide 87 (Fig. 6), which may be driven by cam 85 through a roller 89, a toothed shaft or double-pinion 90, and teeth 92 on the blocks 70—73 forming a rack. The slides 87, through the action of the cam 85, and rollers 89, and pinion 90 and rack 92, shift the blocks 70—73, to and from positions where the projections 75, 76 are in line.

Each two adjacent faces 95, 96 of block 36 are so formed with relation to the adjacent faces 98, 99 of the slide 34 that the block is slightly lifted clear of slide 34 by eccentric 38 in passing from a position where faces 96, 99 for example, are in contact to the position where faces 95, 98 are in contact, thus providing a slight dwell in the driving action of block 36 to give cam 85 time to slide block 70, for example, to a position to free guide 60 before the block 36 exerts driving force against face 98 of slide 34 at the time the direction of driving of the slide 34 changes.

For cutting lugs or projections Z from the marginal portion X of the shell in the trimming action of the dies A and B the said dies are provided with male and female cutting parts 100, 101 (Fig. 2a) on all four sides (or a lesser number of sides), the driving of the slide 34 (and plate 30) in four directions at successive right angles, enabling such lug-cutting to be done without interference.

The die A and plate 30 carrying the same may be so arranged that the opening in die A coincides with the hollow part of spindle 42.

A spacer 105 may be provided between dies A and B. The spacer 105 fits against the inside bottom of shell X and positions the shell with relation to the upper face of die A and lower face of die B, or shearing plane. The spacer 105 may be suspended from die B, preferably "floating" thereon. The floating suspension may comprise a bolt 107 passing through a cupped washer 109 and pressing it against the underside of the spacer 105. The spacer is provided with an opening 111 through which bolt 107 passes, and which opening is large enough to allow lateral movement of the spacer against the underside of die B.

A spring-pad 115 may project through the hollow spindle 42 so as to support a shell X placed in die A and to press the shell against the spacer 105 between dies A and B.

A hanger 117 for the spring pad 115 may be fastened to plate 30.

Studs 120 may be provided for limiting the approach of dies A and B so that the cutting edges will not strike one another in the act of shearing. The studs may be provided on the slide 12 which carries die B, and the lower ends may be made substantially flush with the lower face of die B and abut against the upper side of die A when the dies are brought together.

In the mechanism 32 the moving parts through which the force for driving the plate 30 on which shearing die A is mounted, are the pinion and gear 52, 40, and the eccentric and block 38, 36. The force, transmitted through the eccentric 38 is distributed over 120° of the surface of the eccentric and block 36 and thereby permits of a large force being applied through these parts, and consequently enables the apparatus to be used for shearing shells made of thick or heavy metal. Large areas of contact between the other parts bearing the shearing strains, are present. Wear on the teeth of the gear 40 and pinion 52 will cause inconsequential effect on the position of the plate 30 at the time of stopping, and moreover the driving force through the teeth is minimized because of the mechanical advantage obtained in the gear 40 and the eccentric 38, so that the wear will be slow and the effect of wear will be small and inconsequential for a long time at least. By reason of the large area of the eccentric 38 and block 36 through which the force is transmitted, the wear thereon will be slow. This slow wear will enable mechanism 32 to operate to satisfactorily register the dies A and B for a long period of use of the apparatus.

The descriptions of the method, and of the mode of procedure in practicing the method have been incorporated in the preceding description.

The invention may receive other embodiments than that herein specifically illustrated and described.

Summary of operation

Upon operating the clutch 125, the pulley 20 is made fast to the shaft on which it turns, and drives the cam 114 and the driven member of the clutch 55 through the train of mechanism heretofore described. Cam 14 drives the shearing die B carried by slide 12 down into a shell X resting on spring pad 115 within the shearing die A.

The dies A and B assume the position shown in Fig. 1 when the roller 17 reaches the dwell portion of cam 14. The studs 120 carried by the die-support at this time rest against the die A, limiting the proximity of the dies to give the proper clearance. After dies A and B are brought together, and during the dwell of the slide 12, cam 57 trips the finger 67 and engages the driving and driven parts of the clutch 55. Upon engagement of the clutch 55, the shaft 50 is rotated. The shaft 50 through the pinion 52 thereon, drives the gear 40 having the eccentric 38 thereon.

At this time the slide 34 may be assumed to be in the position shown in Fig. 3 with all of the guides 60—63 supported against the slide 34 by the blocks 70—73. The movement of the gear 40 and eccentric 38 thereon being clockwise, as shown by the arrow, the driving of the block 36 toward the left is initiated. However, there is a slight dwell in the movement of the slide 34 during the interval within which the block 36 shifts from the position wherein the faces 96, 99 of the block and slide, respectively are in contact, to the position wherein the faces 95, 98 come in contact. During this interval or dwell, the cam 85 and the gear 40 shifts the slide 87 connected with guide 60 (at the left of the figure) thus actuating the block 70 which supports guide 60 facing the direction in which the slide 34 is about to move. The shifting of the aforesaid slide 87 rotates the pinion 90 (see Fig. 6) which in turn shifts the block 70 to carry the projections 75 thereon out of alignment with the projections 76 on the guide 60. Meanwhile the parallel pair of guides 62, 63 are held against the adjacent parallel sides of the slide 34 to confine the movement of the slide 34 as it is driven toward the left by the eccentric 38 and block 36.

The guide 61 may also be held by the supporting block 71 until such time as it is necessary to release the guide 61 to permit movement of the slide 34 in the direction of the slide 61. When the slide 34 is driven against the guide 60, after the supporting block 70 has been shifted as just described, the guide 60 may move with the slide 34, so as not to oppose the movement of said slide 34. Slide 34 is driven toward the left to the limit permitted by the eccentric 38. Continued movement of the eccentric 38 brings the block toward the side of the slide 34 at the upper part of Fig. 3. Meanwhile the block 36 moves out of contact with the face 98 of slide 34 to the adjacent face as heretofore explained.

During this latter dwell the cam 85 actuates the slide 87 connected with the block 72, and shifts the block 72 to move the projections 75 out of alignment with the projections 76 of the guide 62, and thereby removes the support for the guide 62, just prior to the driving of the slide 34 toward the guide 62 by the eccentric 38 and block 36, as heretofore described. Moreover, during this dwell of the slide 34 between its drive toward the left in the figure, and its drive toward the top in the figure, the cam 85 actuates the slide 87 connected with the block 70, and drives the slide 87 in the reverse direction, moving the block 70 (see Figs. 3 and 6) to restore the projections 75 thereon to alignment with the projections 76 on the guide 60, thereby confining the slide 34 between the guides 60 and 61, so that when the driving of the slide 30 by the eccentric 38 and block 36 is begun toward the direction of the top of the figure, the movement of the slide 34 is confined between the guides 60, 61. The guide 62, being released by block 72, as heretofore explained, the slide 34 is driven in the direction toward the top of the figure, without being opposed by the guide 62.

The projections 75, 76, may be provided with inclined sides, as shown, so that when the blocks 70—73 are moved into position to support the respective guides 60—63 inclusive, the said guides are forced toward the slide, and in turn forcing the slide 34 to a centered position. At this point it may be stated that the apparatus is so timed that the slide 34 is left in the centered position just described, when the clutch 55 is disconnected upon the completion of a cycle of operation of the machine.

The actuation of the blocks 71—73 supporting the guides 61—63 takes place in the manner similar to that heretofore described, as the eccentric 38 and block 36 move progressively through a complete cycle of 360 degrees.

Referring to Fig. 1 it will be understood that the plate 30, being attached to the slide 34 partakes of the movement of the said slide 34, that is the plate 30 is driven in straight lines in a plurality of directions,—in four directions,—in the mechanism illustrated in the drawings. The die A being mounted on the plate 30 has the same movement as the plate 30 and slide 34.

With the dies A and B together, as illustrated in Fig. 1, and with a shell X interposed as there shown, when the die A is driven to the left, the projecting margin of the shell at the right in the figure will be sheared between the edges of the dies A and B. The spacer 105 within the shell X shifts on the underside of die B during this, and ensuing, movements of the die A.

When the slide 34 is driven toward the top in Fig. 3, the die A moves away from one in the direction of the the line of sight in Fig. 1, shearing the margin x of the shell X at the near side of the shell.

As the slide 34 is shifted toward the right and toward the bottom in Fig. 3, the die A, Fig. 1, is driven toward the right and toward the line of sight, shearing the margins x of the shell X at the left and at the far side of the shell, thus completing the shearing of the margin on the four (all) sides of the shell.

When dies A and B are provided with the cutting portions 100, 101, lugs z Fig. 8, may be cut on all four sides, or on a lesser number of sides.

The driving of shaft 50 is stopped before the slide 12 is allowed to rise, this being effected in the construction shown by the action of the cam 57, finger 67 and cam 68 resulting in the disconnecting or opening of the clutch 55, through which latter the shaft 50 is driven.

As the slide 12 rises, the spring pad 115 lifts the trimmed shell X in the die A so that it may be readily removed and replaced by another shell to be trimmed.

What is claimed is:—

1. A mechanical movement comprising a slide having a plurality of pairs of parallel sides, means for driving said slide in a plurality of directions, guides for each of said sides for confining the movement to straight lines, means for supporting said guides, and means for withdrawing said supporting-means coincident with the movement of said slide toward any guide.

2. A mechanical movement comprising a slide having a plurality of pairs of parallel sides, means for driving said slide in a plurality of directions, guides for each of said slides for confining the movement to straight lines, means for supporting said guides, and means for withdrawing said supporting-means coincident with the movement of said slide toward any guide, and means for moving said supporting means to support a parallel pair of guides in advance of movement of said slide in a direction parallel to the supported guides.

3. A mechanical movement comprising a slide having a plurality of pairs of parallel sides, means for driving said slide in a plurality of directions, guides for each of said sides for confining the movement to straight lines, means for supporting said guides, and means for withdrawing said supporting-means coincident with the movement of said slide toward any guide, said driving means comprising an eccentric, and a block driven thereby.

4. A mechanical movement comprising a slide having a plurality of pairs of parallel sides, means for driving said slide in a plurality of directions, guides for each of said sides for confining the movement to straight lines, means for supporting said guides, and means for withdrawing said supporting-means coincident with the movement of said slide toward any guide, said driving means comprising a block, and means for driving said block in an orbit, said slide having inner sides parallel to said parallel sides, said block having a free movement in passing from contact with one of said inner sides to another, to provide a dwell for said support withdrawing means to act to withdraw said support from the guide toward which said slide thereupon advances.

5. A mechanical movement comprising a slide having a plurality of pairs of parallel sides, means for driving said slide in a plurality of directions, guides for each of said sides for confining the movement to straight lines, means for supporting said guides, and means for withdrawing said suporting-means coincident with the movement of said slide toward any guide, said guides having a plurality of projections, said supports having projections and being movable to bring said projections into and out of line with the projections on said slides.

6. A mechanical movement comprising a slide having a plurality of pairs of parallel sides, means for driving said slide in a plurality of directions, guides for each of said sides for confining the movement to straight lines, means for supporting said guides, and means for withdrawing said supporting-means coincident with the movement of said slide toward any guide, said guides having a plurality of projections, said supports having projections and being movable to bring said projections into and out of line with the projections on said slides, and said withdrawing means comprising a cam, slides actuated thereby, and means transmitting the movement of said last named slide to said guide-supports.

7. Apparatus for trimming the edges of drawn shells or the like, comprising a slide for driving one of a pair of shearing dies arranged to fit around and within the shell to be trimmed, a plurality of pairs of parallel guides for said slide, means for driving said slide between parallel guides in a plurality of directions greater than two, and means for freeing the guides successively in the direction of the line of advance of said slide.

8. Apparatus according to claim 7, said driving means comprising a block, said block and slide having a loose fit, and means imparting orbital movement to said block to move said block against portions of said slide and drive the latter in a plurality of directions as aforesaid.

9. Apparatus for trimming the edges of drawn shells or the like, comprising a slide for driving one of a pair of shearing dies arranged to fit around and within the shell to be trimmed, a plurality of pairs of parallel guides for said slide, supports for said guides, means for driving said slide between parallel guides in a plurality of directions greater than two, and means for withdrawing the supports successively in the direction of the line of advance of said slide.

10. Apparatus according to claim 9, said withdrawing means comprising a cam, slides actuated thereby, and means transmitting the movement of said last named slide to said supports.

11. Apparatus according to claim 9, said guide-supports and guides having projections, and said withdrawing means comprising means for moving said supports to bring the projections thereon into and out of line with the projections on said slides.

12. Apparatus according to claim 9, said guide-supports and guides having projections with inclined sides, and said withdrawing means comprising a cam, slides actuated thereby and means transmitting the movement of said last named slide to move said supports to bring the projections therein into and out of line with the projections on said slide.

CHARLES R. GABRIEL.